US006145025A

United States Patent [19]

Lim

[11] Patent Number: 6,145,025
[45] Date of Patent: *Nov. 7, 2000

[54] METHOD FOR TRANSFERRING DMA DATA IN A MULTIMEDIA INTERGRATED CIRCUIT INCLUDING PRELOADING DMA INSTRUCTIONS IN A FRAME BUFFER

[75] Inventor: Kyu-Tae Lim, Seoul, Rep. of Korea

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,814

[22] Filed: Aug. 19, 1997

[30] Foreign Application Priority Data

Aug. 20, 1996 [KR] Rep. of Korea ...................... 96-34455

[51] Int. Cl.[7] ...................................................... G06F 13/28

[52] U.S. Cl. ................................. 710/22; 710/25; 710/28

[58] Field of Search .................................... 395/842–848, 395/849–855; 710/22, 23, 24, 25, 26, 27, 28, 29, 30, 31, 32, 33, 34, 35

[56] References Cited

U.S. PATENT DOCUMENTS 5,103,499 4/1992 Miner et al. ........................... 345/503
5,655,114 8/1997 Taniai et al. ........................... 395/580
5,797,037 8/1998 Ecclesine ............................... 395/868
5,848,367 12/1998 Lotocky et al. .......................... 701/36

FOREIGN PATENT DOCUMENTS 406096007A 4/1994 Japan .

*Primary Examiner*—Thomas C. Lee
*Assistant Examiner*—Harold Kim
*Attorney, Agent, or Firm*—Jones Volentine, LLC

[57] ABSTRACT

A method for transferring DMA data between the video port and the host interface in a multimedia processor is disclosed. The method includes determining whether one frame data should be transferred between the host interface and the video port; preloading some DMA instructions in the frame buffer and setting the DMA register to be fitted for the DMA operation; and fetching the preloaded instructions from the frame buffer subsequently by the DMA controller to perform video data transfer at a predetermined data bandwidth. According to this invention, the time consumption of a microprocessor for programming the DMA controller is reduced, thereby enhancing the data transfer rate between the host interface and video port of the multimedia computer system.

16 Claims, 3 Drawing Sheets

Start
S100 Video Block Send/Receive 1 Frame Data To/From External Video Device ?
No
Yes
Video Block Do Interrupt CPU — S200
CPU Preloads Some Instructions In Frame Buffer — S310
CPU Sets Source/ Destination Register — S321
CPU Sets Transfer Count Register — S322
CPU Sets DMA Start Enable Register — S323
S320
S300
DMA Transfer Data From Source To Destination — S410
S420 Transfer Count End ?
No
Yes
S430 Instruction Fetch Enable ?
Yes
No
S440 One DMA Instruction Fetch From Frame Buffer
S400

10
P C I Bus
22
20
P C I Interface
25
26
28
DMA FIFO
Read FIFO
Write FIFO
70
45
30
40
60
RAMDAC
Display Interface
VLIW Processor
Video Interface
Video System
47
42
Display FIFO
Video FIFO
46
Frame Buffer Controller
Frame Buffer (RDRAM)
50

METHOD FOR TRANSFERRING DMA DATA IN A MULTIMEDIA INTERGRATED CIRCUIT INCLUDING PRELOADING DMA INSTRUCTIONS IN A FRAME BUFFER

BACKGROUND OF THE INVENTION

The present invention relates to a method for transferring DMA data. More particularly to a method for transferring DMA data between the video port and the host interface in a multimedia processor.

In a modem personal computer (PC), most PC buses make provisions for giving expansion boards control over the Direct Memory Access (DMA) controllers in the computer host. This way, the microprocessor itself need not be burdened with controlling the expansion bus. Instead, the microprocessor delegates the control of the bus to special circuitry dedicated to the task, i.e., a DMA controller. In addition, DMA operations can also be used to move data between I/O devices and memory. Modem PCs that use a DMA controller typically integrate this circuitry with the rest of the system support inside the chipset. For operation, the DMA controller inside this specialized chip must know the base location of where bytes are to be moved from, the address to where the bytes should go, and the number of bytes to move. The specific DMA controller used in all IBM® computers is completely programmable and after it has received the necessary information from the host microprocessor, is operated through a series of I/O registers.

Recently, highly-integrated multimedia integrated circuits (ICs) have been developed that individually replace close to half a dozen expansion boards. These chips are designed to eliminate payment for duplicated logic and memories, and complicated set-up configurations in high-end multimedia subsystems. One example of such a multimedia IC is the Mpact media processor developed by Chromatic Research Inc. The Mpact media processor is described in "Reprogrammable IC Takes On Graphics, Video, and Audio," by Dave Bursky, in Electronic Design/Oct. 13, 1995, pp.133–137, and the related description is incorporated herein by reference.

This particular multimedia IC is based on a programmable very-long-instruction-word (VLIW) engine that performs single-instruction/multiple-data (SIMD) operations and vector processing. The VLIW approach and the multiple on-chip processing blocks combine to give the chip elements of both supercomputers and digital signal processors. This also allows the chip to achieve the high throughput needed to simultaneously handle a wide assortment of multimedia tasks, replacing a collection of dedicated boards.

The configuration of a conventional Mpact processor is schematically shown in FIG. 1. The Mpact processor comprises a PCI bus 10, a Mpact chip 20, an RDRAM frame buffer 50, a video system 60, and a RAMDAC 70. The Mpact multimedia chip 20 comprises a 32-bit PCI interface 22, dedicated DMA, Read, and Write FIFO buffers 25, 26, and 28, a VLIW processor block 30, a video interface 40, a video FIFO buffer 42, a display interface 45, a frame buffer controller 46, and a display FIFO buffer 47.

As shown in FIG. 2, the VLIW processor block 30 comprises four arithmetic and logic units (ALUs) 38, an instruction decoder 36, an instruction fetch 34, and an SRAM 32 that serves as a DMA register file as shown in FIG. 2. The long instruction word can be used to program each computational block simultaneously so that many parallel operations can be performed during each clock cycle.

The frame buffer controller 46, which may be a high-bandwidth Rambus DRAM interface, is connected to the RDRAM frame buffer 50 and has sufficient bandwidth for video data streams. The 32-bit PCI interface 22 is provided to allow data transfers between the chip and the host system or from PCI to PCI device. The PCI interface 22 is connected to the dedicated DMA, Read, and Write FIFO buffers 25, 26, and 28 for DMA, Read, and Write operations, respectively. Data moves between the on-chip SRAM 32 and the external RDRAM frame buffer 50 at a high data transfer rate, for example up to 500 Mbytes/sec through the frame buffer controller 46. This high data rate ensures that the various computational blocks on the chip are never waiting to send or receive data between the host bus and the off-chip DRAM 50 used to hold image data.

The display bus port or display interface 45 and the a display FIFO buffer 47 tie into the off-chip RAMDAC 70, which in turn can drive an RGB monitor. The video bus port or video interface 40 and the video FIFO buffer 42 can either handle direct digital video data, or tie into the off-chip video system 60 that includes video ADCs and DACs for capturing or delivering analog NTSC/PAL video signals. The frame buffer controller 46 uses the DMA controller to move data in and out of the RDRAM buffer 50 without host intervention. Also, the DMA controller manages data transfers between the host interface 22 and the video interface 40. The DMA register 32 of the VLIW processor block 30 stores a data transfer count required for DMA operation, a frame buffer read/write address, a host bus read/write address, and a status information informing start/end of the DMA operation.

The DMA operation in the video port 40 is performed normally at under 4-kbyte wide data per instruction. This is because the largest bandwidth of the digital video format receivable in the video port 40 is 22.1 Mbyte/sec, in case of PAL video signals. This digital image data is transferred to the host interface 22 in 4-kbyte units by a DMA instruction. Also, the digital image data is transferred to the host memory in 4-kbyte units. Thus, the host microprocessor should load the DMA instruction onto the DMA controller as many as one frame image data is transferred to the host interface. Consequently, the host microprocessor exhausts almost all of its processing ability in programming the DMA controller. This will deteriorate system performance as well as system speed.

Thus, when DMA operations are performed in the multimedia IC to move data between a video port and a host interface, and when large amounts of data must be transferred, the microprocessor will have to frequently load the DMA instructions into the DMA controller. This can severely reduce CPU performance in programming the DMA controller and can deteriorate the video data transfer rate.

SUMMARY OF THE INVENTION

It is therefore an object of the invention to provide a new and effective method for transferring DMA data in the integrated multimedia processor.

According to the present invention, a set of instructions the DMA controller should be performed are preloaded in the memories, and they are read sequentially from the memories to perform the instructions. Further, the method for transferring DMA data comprises the steps of determining whether one frame data should be transferred between the host interface and the video port; preloading some DMA instructions in the frame buffer and setting the DMA register to be fitted for the DMA operation; and fetching the preloaded instructions from the frame buffer subsequently by the DMA controller to perform video data transfer at a predetermined data bandwidth.

According to the method of the invention, reducing the time consumption of microprocessor for programming the DMA controller is possible, thereby enhancing the data transfer rate between the host interface and video port of the multimedia computer system.

BRIEF DESCRIPTION OF THE DRAWINGS

This invention may be understood and its object and advantages will become apparent to those skilled in the art by reference to the accompanying drawings as follows.

DETAILED DESCRIPTION OF THE PREFERRED EMBODIMENTS

The present invention relates to a method for transferring DMA data between the host interface and the video port in a multimedia IC, for example aforementioned Mpact media processor.

The problems with conventional media processors noted above can be solved by the present invention which provides a new method of transferring DMA data between the host interface and the video port, in which the host microprocessor preloads some instructions required by the DMA controller for transferring one frame image data in the off-screen area of the frame buffer 50. The method will be described in detail as follows with reference to the flow chart of FIG. 3.

Figure 1:
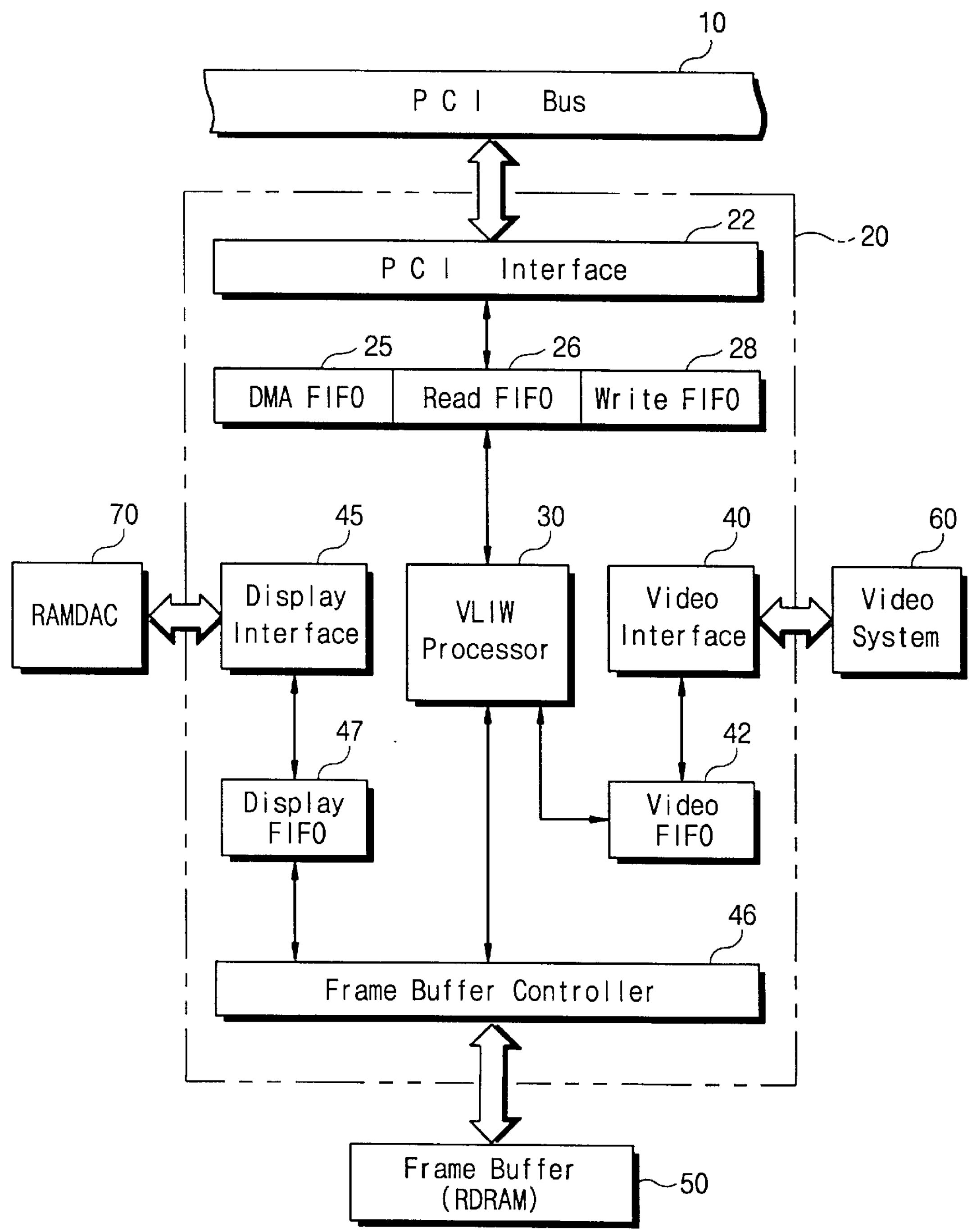
FIG. 1 is a block diagram for depicting a conventional highly-integrated multimedia processor.
Figure 2:
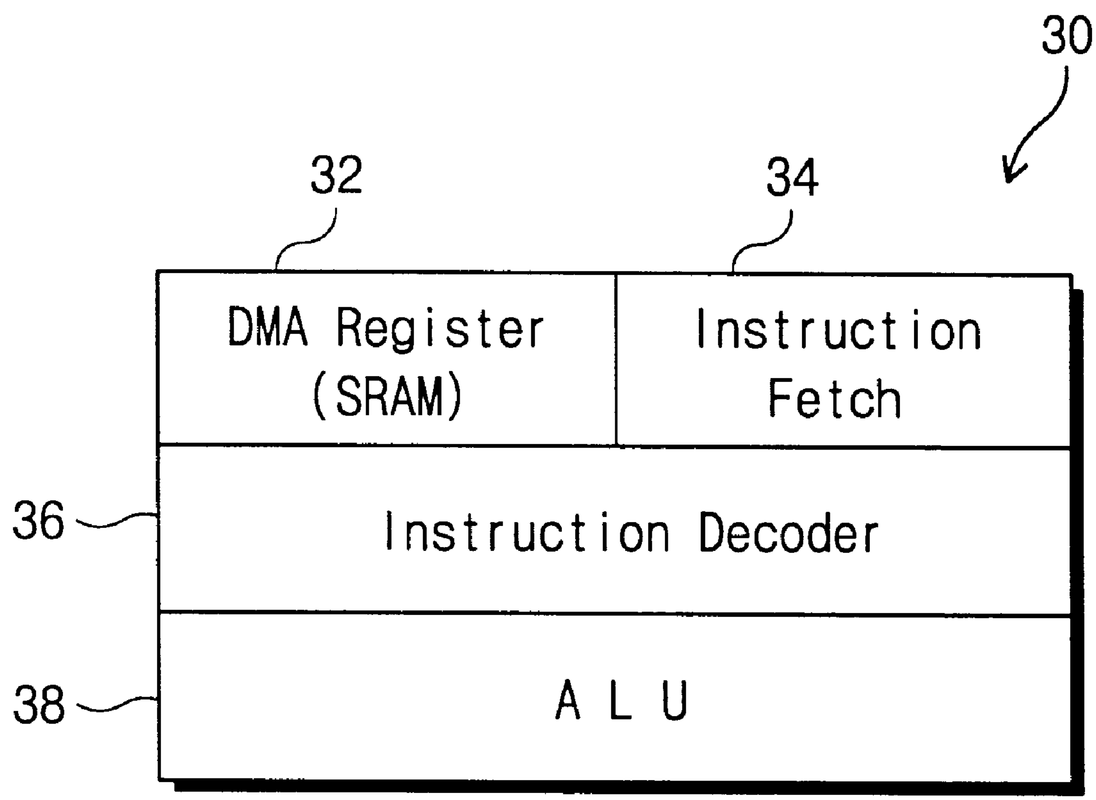
FIG. 2 is a diagram for showing configuration of the VLIW processor shown in FIG. 1.
Figure 3:
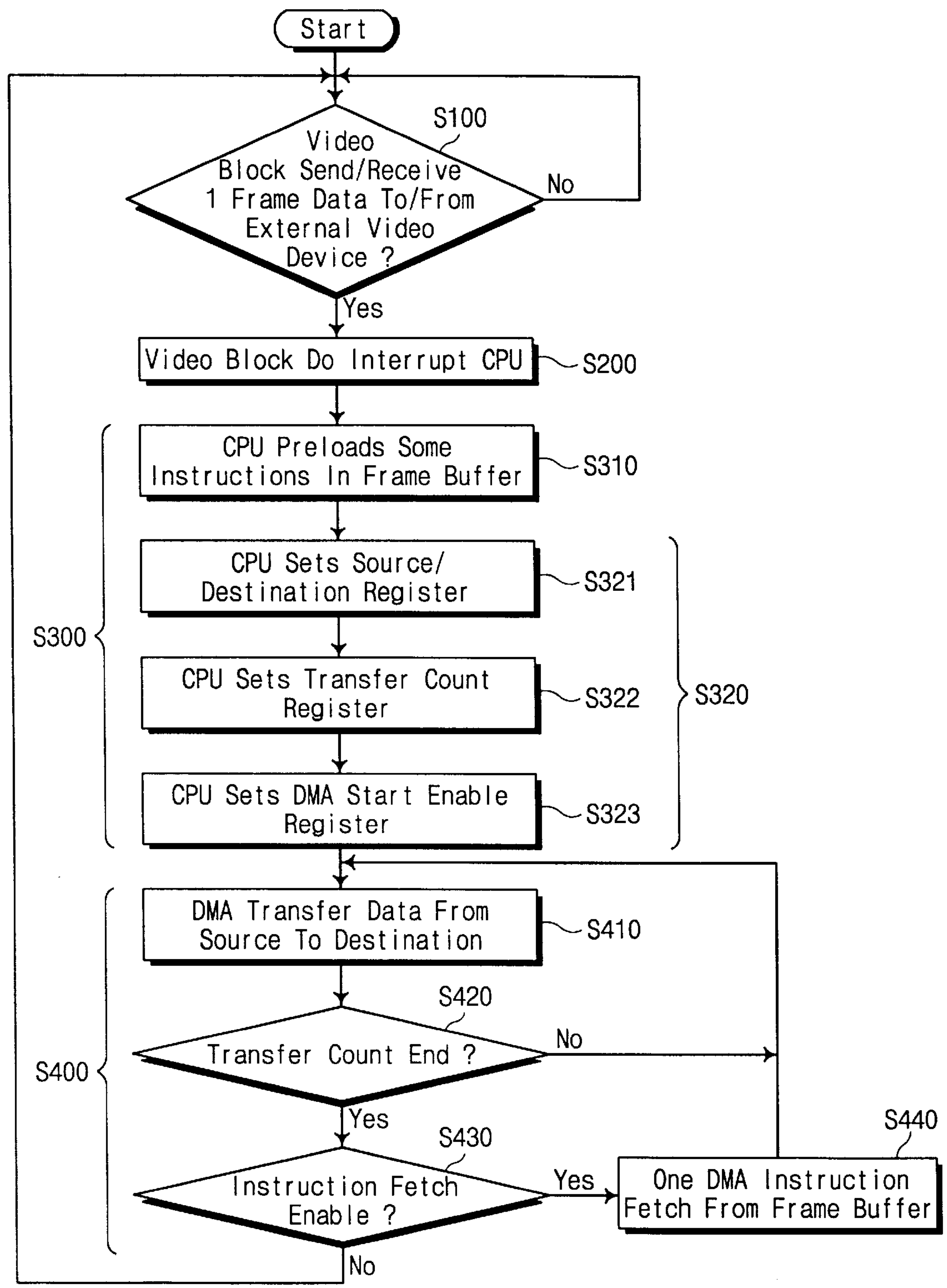
FIG. 3 is a flow chart for illustrating a DMA data transferring method in accordance with the present invention.

As shown in FIG. 3, the CPU first determines, at step 100, whether one frame of video data should be transferred between the host interface 22 and the video port 40. If this is true, the video controller interrupts the CPU at step 200. Responsive to this interrupt signal, the CPU in step 300 preloads DMA instructions into the frame buffer 50 and sets the DMA register 32 to be fitted for the DMA operation. In step 400, the DMA controller then performs the DMA data transfer by subsequently fetching the preloaded instructions.

Step 300 can be further divided into steps 310 and 320. In step 310 the CPU preloads some instructions in the frame buffer 50 through the frame buffer controller 46 by writing the instructions at the off-screen area in the frame buffer 50. In step 320 the CPU sets the source/destination registers of the DMA register 32.

Step 320 can be further divided into steps 321, 322, and 323. In step 321, the DMA register 32 is set to be appropriate for the DMA operation. Then, the CPU sets the transfer count register at step 322 and sets DMA start enable register by writing the DMA start instruction into the DMA controller at step 323.

Step 400 can be further divided into steps 410, 420, 430, and 440. In step 410, the DMA controller draws out the digital image data loaded in the frame buffer 50 as much as the transfer count and transfers them to the host interface 22. Then, steps 420 and 430 determine whether the transfer count has ended and whether DMA instructions are fetchable. If this is the case, one DMA instruction is fetched from the frame buffer 50 to transfer the video data to the host interface 20 at step 440. Thus, in step 400, the video data is loaded to the PCI bus 10.

If all DMA instructions are fetched sequentially and the required data transfer has finished, processing returns to the step 100 after step 430, to decide whether another frame video data should be transferred. Again, the DMA instructions are preloaded in the frame buffer and the corresponding DMA operation is performed.

As apparent from foregoing, the DMA data transferring method according to the present invention increases the efficiency of use of the microprocessor as compared with the case when DMA instructions are received directly from the microprocessor one by one. Furthermore, when one piece of frame data is transferred to or from the external video system, the number of interrupts are reduced to one, as compared with that of the conventional method, which requires 22 interrupts. This will contribute to an increase of the video data transfer rate and thereby enhancing the system performance.

While the invention has been described in terms of an exemplary embodiment, it is contemplated that it may be practiced as outlined above with modifications within the spirit and scope of the appended claims.

What is claimed is:

1. A method for transferring DMA data in a multimedia processor, comprising:

determining whether frame data should be transferred between a host interface and a video port;

preloading DMA instructions into a frame buffer and setting a DMA register to be fitted for DMA operation when said determining determines frame data should be transferred, the preloading of DMA instructions and setting the DMA register comprising setting a source/destination register, setting a transfer count register, and setting a DMA start enable register by writing a DMA start instruction into the DMA controller;

fetching the preloaded DMA instructions from the frame buffer, said fetching consisting essentially of fetching only one DMA instruction from the frame buffer for each transfer; and transferring video data by a DMA controller at a predetermined data bandwidth.

2. The method for transferring DMA data as recited in claim 1, wherein the preloading is started in response to an interrupt signal invoked by a video controller.

3. The method for transferring DMA data as recited in claim 1, further comprising writing the preloaded DMA instructions in an off-screen area of the frame buffer by a frame buffer controller.

4. The method for transferring DMA data as recited in claim 1, wherein the fetching of the preloaded instructions includes:

determining whether the transfer count has ended;

determining whether a DMA instruction is fetchable; and enabling the DMA controller to transfer the video data from source to destination.

5. The method for transferring DMA data as recited in claim 1, wherein the transferring includes transferring a plurality of data, each transfer of data requiring a corresponding instruction and the preloading includes preloading more than one instruction into the frame buffer.

6. The method for transferring DMA data as recited in claim 1, wherein the transferring includes transferring a plurality of data, each transfer of data requiring a corresponding instruction and the preloading includes preloading all instructions required for transferring the plurality of data into the frame buffer.

7. The method for transferring DMA data as recited in claim 1, wherein said transferring video data includes only a single interruption of the host interface.

8. The method for transferring DMA data as recited in claim 1, further comprising, after said transferring is complete, returning to said determining.

9. In a multimedia processor for simultaneously handling a wide assortment of multimedia tasks and comprising a host interface, a DMA register, a frame buffer controller coupled with a frame buffer, and a video port coupled with external video system, wherein a DMA operation is performed to move data between the video port and the host interface, a method for transferring DMA data comprising:

determining whether frame data should be transferred between the host interface and the video port;

preloading DMA instructions in the frame buffer and setting the DMA register to be fitted for the DMA operation when said determining determines frame data should be transferred, the setting of the DMA register comprising setting the source/destination register, setting a transfer count register, and setting a DMA start enable register by writing a DMA start instruction into the DMA controller; and fetching the preloaded instructions from the frame buffer subsequently by a DMA controller to perform video data transfer at a predetermined data bandwidth, wherein said fetching consists essentially of fetching only one DMA instruction from the frame buffer for each transfer.

10. The method for transferring DMA data as recited in claim 9, further comprising starting the preloading in response to an interrupt signal invoked by a video controller.

11. The method for transferring DMA data as recited in claim 9, wherein the preloaded DMA instructions are written in the off-screen area of the frame buffer by the frame buffer controller.

12. The method for transferring DMA data as recited in claim 9, wherein the fetching of the preloaded instructions includes;

determining whether the transfer count has ended;

determining whether a DMA instruction is fetchable; and enabling the DMA controller to transfer the video data from source to destination.

13. The method for transferring DMA data as recited in claim 9, wherein the transferring includes transferring a plurality of data, each transfer of data requiring a corresponding instruction and the preloading includes preloading more than one instruction into the frame buffer.

14. The method for transferring DMA data as recited in claim 9, wherein the transferring includes transferring a plurality of data, each transfer of data requiring a corresponding instruction and the preloading includes preloading all instructions required for transferring the plurality of data into the frame buffer.

15. The method for transferring DMA data as recited in claim 9, wherein said video data transfer includes only a single interruption of the host interface.

16. The method for transferring DMA data as recited in claim 9, further comprising, after said video data transfer is complete, returning to said determining.

* * * * *